United States Patent [19]

Wank et al.

[11] Patent Number: 4,707,396

[45] Date of Patent: Nov. 17, 1987

[54] LAMINATES

[75] Inventors: Joachim Wank, Dormagen; Werner Waldenrath, Cologne; Heinz Schmitz, Dormagen; Günter Pakulat, Kuerten, all of Fed. Rep. of Germany

[73] Assignee: Bayer Aktiengesellschaft, Leverkusen, Fed. Rep. of Germany

[21] Appl. No.: 891,573

[22] Filed: Aug. 1, 1986

[30] Foreign Application Priority Data

Aug. 10, 1985 [DE] Fed. Rep. of Germany ....... 3528812

[51] Int. Cl.$^4$ ............................................. B32B 27/40
[52] U.S. Cl. .................................... 428/216; 428/412; 428/424.2; 428/424.6; 428/424.7
[58] Field of Search ............... 428/424.7, 424.6, 425.1, 428/412, 424.4, 424.2, 220, 216

[56] References Cited

U.S. PATENT DOCUMENTS

| 3,388,032 | 6/1968 | Saunders | 428/412 |
|---|---|---|---|
| 4,121,014 | 10/1978 | Shaffer | 428/412 |
| 4,289,825 | 9/1981 | Kolycheck et al. | 428/424.6 |
| 4,368,231 | 1/1983 | Egert et al. | 428/422 |
| 4,410,595 | 10/1983 | Matsumoto et al. | 428/424.7 |
| 4,456,658 | 6/1984 | Kubitza et al. | 428/424.6 |
| 4,540,622 | 9/1985 | Brunion et al. | 428/412 |
| 4,592,947 | 6/1986 | Hunter et al. | 428/412 |
| 4,594,290 | 6/1986 | Fischer et al. | 428/412 |

Primary Examiner—Edith Buffalow
Attorney, Agent, or Firm—Connolly and Hutz

[57] ABSTRACT

The present invention relates to laminates consisting of a thermoplastic film, a polyurethane layer, a color layer, if appropriate a second polyurethane layer and a thermoplastic layer and a process for their production.

6 Claims, No Drawings

LAMINATES

The present invention relates to laminates with a thickness of 0.5 mm to 20 mm, consisting of
1. a 0.02 mm to 0.8 mm thick film of a thermoplastic,
2. a polyurethane layer which is tack-free at room temperature,
3. a colour layer, if appropriate
4. a second polyurethane layer which is tack-free at room temperature and
5. a thermoplastic layer with a thickness of 0.4 mm to 19 mm.

Films of thermoplastics which are suitable according to the invention are those of known thermoplastic aromatic polycarbonates with weight-average molecular weights $\overline{M}w$ of 25,000 to 200,000, preferably 30,000 to 120,000 and in particular 30,000 to 80,000 ($\overline{M}w$ determined via $\eta_{rel}$ in $CH_2Cl_2$ at 20° C. and a concentration of 0.5 g per 100 ml); films of thermoplastics which are suitable according to the invention are also preferably those of known thermoplastic polyaryl sulphones, which can be linear (see DE-OS (German Published Specification) No. 2,735,144) or branched (see DE-OS (German Published Specification) No. 2,735,092 and DE-OS (German Published Specification) No. 2,305,413).

Suitable linear polyaryl sulphones are all the known aromatic polysulphones or polyether-sulphones with an $\overline{M}w$ (weight-average molecular weight measured, for example, by means of light scattering) of between about 15,000 and about 55,000, preferably between about 20,000 and about 40,000. Such polyaryl sulphones are described, for example, in DE-OS (German Published Specification No. 1,719,244 and U.S. Patent Specification No. 3,365,517.

Suitable branched polyaryl sulphones are, in particular, the branched polyaryl ether-sulphones according to DE-OS (German Published Specification) No. 2,305,413 and U.S. Pat. No. 3,960,815, the $\overline{M}w$ of which (weight-average molecular weight, measured, for example, by means of light scattering) are between about 15,000 and about 50,000, preferably between about 20,000 and 40,000. (For further details in this context, see DE-AS (German Published Specification) No. 3,010,143 (Le A 20 254)).

Thermoplastics which are suitable for the films according to component 1 are preferably also thermoplastic cellulose esters, thermoplastic polyvinyl chlorides and thermoplastic styrene/acrylonitrile copolymers.

Cellulose esters which are suitable according to the invention are obtained by customary processes by esterification of cellulose with aliphatic monocarboxylic acid anhydrides, preferably acetic and butyric or acetic and propionic anhydride. The hydrolysis, which is to be carried out in the crude solution, is controlled by a slight excess of water so that a low hydroxyl content (4 to 25) is obtained. The oxidative bleaching of the cellulose ester isolated from the solution must be carried out so that oxidizing agent is no longer detectable in the end product; if appropriate, after-treatment with reducing agents must be carried out. To determine the OH number, the free hydroxyl groups of the cellulose ester are esterified with acetic anhydride in pyridine and the excess anhydride is reacted with water and back-titrated [Instructions: C. J. Mahn, L. B. Genung and R. F. Williams, Analysis of Cellulose Derivatives, Industrial and Engineering Chemistry, Volume 14, No. 12, 935–940 (1942)].

The viscosity of the cellulose esters should be 0.3 to 0.5 poise, measured as a 20% strength by weight solution in acetone. Cellulose esters which are preferably to be used have, in the case of the acetobutyrates, an acetic acid content of 17 to 23% by weight and a butyric acid content of 45 to 50% by weight and, in the case of the acetopropionates, a propionic acid content of 61 to 69% by weight and an acetic acid content of 2 to 7% by weight. The OH numbers are usually between 4 and 25. The mean weight-average molecular weights $\overline{M}w$ are between 10,000 and 1,000,000, preferably between 100,000 and 500,000.

Thermoplastic polyvinyl chlorides which are suitable according to the invention are, for example, the commercially available grades of PVC.

Thermoplastic styrene/acrylonitrile copolymers which are suitable according to the invention are copolymers of styrene with, preferably, acrylonitrile which are obtained, for example, with an $\overline{m}w$ of 10,000 to 600,000 ($\overline{M}w$ is measured in dimethylformamide at $C=5$ g/l and 20° C.) from the monomers or mixture of monomers by suspension polymerization in the presence of catalysts. For literature in this context, see Beilsteins Handbuch der organischen Chemie (Beilstein's Handbook of Organic Chemistry), fourth edition, Duttes supplement B 1.5, pages 1163–1169, Springer Verlag 1964 and H. Ohlinger, Polystyrol 1. Teil, Herstellungsverfahren und Eigenschaften der Produkte (Polystyrene Part 1, Preparation processes and properties of the products), Springer Verlag (1955).

Reference may be made to DE-OS (German Published Specification) No. 2,517,033 (Le A 16 244), or to DE-OS (German Published Specification) No. 2,531,240 (Le A 16 536) for the known production of the films according to component 1.

The films according to component 1 are matted on one side or structured on one side, which is effected in a known manner by pressing the melt of the thermoplastic through a flat sheet die and taking off the melt strand over a matted or structured cooling roll.

The films can also be polished on one side and matted on one side.

The thickness of the films is preferably between and 0.05 and 0.8 mm.

Both aqueous dispersions, which dry to give transparent films, of preferably linear polyester-polyurethanes and organic solutions, which dry to give transparent films, of preferably linear polyester-polyurethanes, which optionally contain a polyisocyanate of higher functionality as a crosslinking agent, can be used to produce the polyurethane layers according to components 2 and 4 which are suitable according to the invention. Suitable polyurethane dispersions are, for example, those based on linear polyester-diols, aromatic or aliphatic diisocyanates and, if appropriate, the customary chain-lengthening agents, which have been prepared co-using ionic build-up components in accordance with the doctrine of U.S. Pat. No. 3,479,310 or DE-AS (German Published Specification) No. 1,495,847. The aqueous dispersions of preferably linear polyesterpolyurethanes containing carboxylate and sulphonate groups, such as can be obtained according to DE-OS (German Published Specification) No. 2,804,609, are also particularly suitable. If organic solutions of preferably linear polyester-polyurethanes are used, solutions of non-ionic linear polyester-polyurethanes in suitable solvents are preferred. These polyurethanes are preferably reaction products of (i) aromatic diisocyanates, such as 2,4- and/or 2,6-diisocyantotoluene, 4,4'-diisocyanatodiphenylmethane, hexamethylene diisocyanate, isophone diisocyanate or 1,5-diisocyanatonaphthalene or mixtures thereof, with (ii) polyester-diols in the molecular weight range ($\overline{m}$ w) of 1,000 to 4,000, in particular those based on adipic acid and suitable glycols, such as ethylene glycol, 1,4-dihydroxybutane, 1,6-dihydroxyhexane and mixtures thereof, and, if appropriate, (iii) chain-lengthening agents, for example the lastmentioned glycols, the reaction partners being used with an NCO/OH equivalent ratio of 0.9:1 to 1:1.1, preferably 0.95:1 to 1:1, being maintained, and, if appropriate, 0.1 to 2 moles of chain lengthener or chain lengthener mixture being used per mole of polyester-diol. Suitable solvents for such polyester-polyurethanes are, for example, ethyl acetate, butyl acetate, methyl ethyl ketone, methyl isobutyl ketone or mixtures consisting of such solvents. The dispersions or solutions are in general used with a solids content of 10–40% by weight. It can frequently be advantageous to incorporate minor amounts of a polyisocyanate of higher functionality, for example tris-(6-isocyanatohexyl)-biuret, into the solutions mentioned, in order to improve the mechanical properties of the polyurethane film finally obtained.

The intermediate layer according to component 2 can be applied either continuously to the film by the roll coater or doctor blade process, or by the screen printing process before the decoration is printed. The amount of dispersion or solution is in general chosen so that dry film thicknesses of 2–80 μm, preferably 15–30 μm, result.

The intermediate layer according to component 4 is printed onto the decorative colour layer 3 by the screen printing process.

The intermediate layers according to components 2 and 4 are completely tack-free thermoplastic layer ends at room temperature.

The screen printing process according to the present invention is understood as pressing paints or lacquers through a sieve fabric clamped in a frame, the mesh of which is partly closed in accordance with the print master. The openings which remain in the sieve fabric correspond to the print image.

The thickness of the polyurethane layer 4 is 2 to 80 μm, preferably 15 to 30 μm.

Suitable colour layers according to component 3 consist of lacquers based on polyacrylates or mixtures of polyacrylate and cellulose acetobutyrate, or a PVC copolymer, containing pigments and/or dyestuffs.

The colour layers 3 are applied to the polyurethane layer 2 by the screen printing process.

The thickness of the colour layers is between 5 and 50 μm.

The thermoplastic layer according to component 5 are preferably of thermoplastic polymethyl methacrylate, thermoplastic acrylonitrile/butadiene/styrene copolymers, thermoplasit polystyrene, thermoplastic polycarbonate, thermoplastic styrene/acrylonitrile copolymers and thermoplastic cellulose esters, the last three thermoplastics mentioned already being defined under component 1.

Thermoplastic polymethyl methacrylates are, for example, the commercially available grades of Plexiglas.

Thermoplastic acrylonitrile/butadiene/styrene copolymers are, in particular, mixtures of (a) 50 to 70% by weight of one or more grafted products and (b) 95 to 30% by weight of one or more thermoplastic resins.

Grafted products (a) are preferably polymers obtained by polymerization of grafting monomers in the presence of a rubber as the graft base. The rubber content is preferably 5 to 80% by weight, and also depends on the polymerization process.

Possible graft bases are, in particular, polybutadiene, natural rubber, butadiene/acrylonitrile copolymers and butadiene/styrene copolymers and block polymers. Acrylic ester/vinyl ether polymers and EPDM terpolymers can also be used grafting monomers are chiefly styrene mixtures of styrene and acrylonitrile, preferably in a weight ratio of 90:10 to 50:50. Mixtures of styrene and methyl (meth)acrylate, preferably in a weight ratio of 5:95 to 95:5, and styrene/acrylonitrile/methyl (meth)acrylate mixtures.

The preparation of such grafted products is known per se. The grafting monomers can be polymerized in the presence of a rubber latex in emulsion. The grafting reaction is then started with a free radical initiator. If the rubber is partly crosslinked and certain ratios of the amounts of grafting monomer and graft bases are maintained during the grafting reaction, the size of the rubber particles in the latex determines the particle size of the resulting graft polymer. The grafted-on shell of chains of the polymer of the grafting monomer bonded chemically to the rubber particles is relatively thin and does not substantially change the size of the rubber particle. Size here is understood as the $d_{50}$ value, that is to say the diameter above which and below which in each ase 50% of the diameters of the particles lie. The grafting reaction is incomplete, so that its product is called the grafted product. In addition to the actual graft polymer, it also contains non-grafted copolymers of the grafting monomers.

The graft polymers can also be prepared by bulk/solution or bulk/suspension polymerization, preferably from monomer-soluble rubber. The size of the grafted rubber particles is then determined in the phase inversion stage and can be influenced mechanically (by stirring) and by chemical influencing of the phase equilibrium (addition of dispersing agents). In general, particles of 1 μm diameter or larger are obtained in bulk/solution grafting processes. The rubber content of the grafted product is limited to not more than 25%.

Products in which the particles have a size of 0.05 to 20 μm and those in which a considerable portion of the grafting monomers is included as homo- or copolymer inside the rubber particles can be used according to the invention. Preferred particle sizes are 0.05 to 1.2 μm, in particular 0.05 to 0.6 μm. It is also possible to use several different grafted products side by side, for example two grafted products which differ in the degree of grafting (or in the grafting density), the particle size or in both simultaneously. A mixture of a grafted product with particles with a size $d_{50}$ of 0.35 to 10 μm and a grafted product with particles with a size $d_{50}$ of 0.05 to 0.32 μm, for example, is particularly suitable (ABS polymers thus prepared are also called bimodal systems).

The grafted products preferably contain 35 to 80% by weight, in particular 40 to 70% by weight, of rubber and have particle sizes $d_{50}$ of 0.1 to 0.5 μm. They are employed in an amount such that the finished ABS polymer contains 5 to 25% by weight, preferably 5 to 20% by weight, of rubber.

The thermoplastic resin (b) which forms the second constituent of the ABS polymer is the continuous matrix and is a polymer or copolymer of styrene, α-methylstyrene/acrylonitrile/methyl (meth)acrylate or maleic anhydride. Polystyrene, styrene/acrylonitrile copolymers with an acrylonitrile content of 20 to 35% by weight and α-methylstyrene/acrylonitrile copolymers with an acrylonitrile content of 20 to 31% by weight are preferred. The weight-average of the molecular weight of these resins is 50,000 to 550,000; the molecular heterogeneity H.

$(M/M-1=H)$ is 1.0–3.5

If a single grafted product is used, it is advantageous for the quantitative composition of the grafting monomers and that of the resin to be similar or identical. If a mixture of two grafted products of different particle sizes is used, it is advantageous for the quantitative composition of the grafting monomers of the grafted product with the coarser particles to differ from the composition of the resin. α-Methylstyrene in combination with acrylonitrile cannot be grafted, and can only be used in the resin.

The thermoplastic resins, for example styrene/acrylonitrile or α-methylstyrene/acrylonitrile copolymers, can be prepared by known processes, for example by bulk polymerization, solution polymerization, suspension polymerization and emulsion polymerization.

The grafted product and thermoplastic resin are frequently prepared separately, in both cases usually by emulsion polymerization. If the components are obtained in latex form, the latices can be mixed and precipitated together.

Thermoplastic polystyrenes which are suitable for preparing the layer of plastic 5 are homopolymers of styrene or copolymers of styrene with, preferably, acrylonitrile and/or butadiene, and/or maleic acid esters, which are obtained, for example, with an $\overline{M}w$ of 10,000 to 600,000 ($\overline{M}w$ is measured dimethylformamide at c=5 g/l and 20° C.) from the monomers or mixture of monomers by suspension polymerization in the presence of catalysts. (For literature in this context, see: Beilsteins Handbuch der Organischen Chemie (Beilstein's Handbook of Organic Chemistry), fourth edition, third supplement, Volume 5, pages 1163–1169, Springer Verlag 1964 and H. Ohlinger, Polystyrol, 1. Teil, Herstellungsverfahren und Eigenschaften der Produkte (Polystyrene, Part 1, Preparation processes and properties of the products), Springer Verlag 1955).

The layer of plastic 5 is introduced and the laminate according to the invention is thus produced by injecting the layer 5 under the layers 1+2+3 or 1+2+3+4 by known processes (in this context, see, for example, DE-OS (German Published Specification) No. 2,755,088 (Le A 18 549).

The thickness of the layer of plastic 5 is preferably between 0.4 and 19 mm.

The present invention furthermore relates to a process for the production of the laminates according to the invention from layers 1+2+3 +5 and, if appropriate, 4, which is characterized in that films of thermoplastics are coated with polyurethanes and then coated with a colour layer and, if appropriate, with a second polyurethane layer by the screen printing process and, finally, a thermoplastic layer is injected under the other layers in a known manner.

Laminated films with polyurethane adhesion are known. (See, for example, DE-OS (German Published Specification) No. 2,517,032 and DE-AS (German Published Specification) No. 3,010,143).

Injection of the thermoplastics under thermoplastic films is likewise known (see DE-OS (German Published Specification) No., 2,755,088).

However, no intermediate colour layer is mentioned in this literature.

Laminates of polycarbonates and glass which contain polyurethane intermediate layers of preferably thermoplastic polyurethanes are known from DE-OS (German Published Specification) No. 1,594,164. These laminates can be used, for example, as windscreens for motor vehicles. Coloration of these laminates is not referred to in DE-OS (German Published Specification) No. 1,594,164.

The object of the present invention was thus to provide laminates containing printed images in a simple manner. The advantages of these laminates are 1. Components which are ready for installation, i.e. provided with the final decoration, are removed from the injection moulding machine.
2. The printed decoration is protected from wiping off and wear, since it is between the front film and the carrier layer.
3. The laminates can be produced particularly easily.
4. By suitable choice of the components, the values of the properties can be varied within a wide range.

The laminates according to the invention are used, for example, for screens for domestic, phonographic and TV appliances.

EXAMPLE 1

A 200μm thick film, structured on one side and matt on one side, of thermoplastic diphenol A homopolycarbonate ($\eta_{rel}$=1.31, measured in $CH_2Cl_2$ at 25° C. and at a concentration of 0.5 g/100 ml) is printed on the matt side with an aqueous, commercially available dispersion of a linear polyester-polyurethane based on polyethylene adipate with a molecular weight of $\overline{M}w$ 2,000 and toluylene diisocyanate by the screen printing process, a screen with 43 threads/cm being used. The thickness thus obtained for the polyurethane layer is 20 μm. After drying the layer (2 minutes at 80° C.), the colour decoration is printed onto the polyurethane intermediate layer by the screen printing process in a manner which is known per se. A commercially available PVC-based paint is used as the colour. The film thus printed is punched in accordance with the shape of the finished article and laid in the opened injection mould for the carrier material so that the structured side of the polycarbonate film is opposite the injection point for the thermoplastic.

If fixing of the film is necessary, this can be effected by means of electrostatic charging of the film or by a vacuum. After closing the mould, the injection process is carried out in a manner which is known per se, with a thermoplastic of an acrylonitrile/butadiene/styrene copolymer with a $\eta_{rel}$ of 1.4, which has been obtained by copolymerization of 50% by weight of acrylonitrile, 20% by weight of butadiene and 30% by weight of styrene in accordance with DAS (German Published Specification) No. 2,827,594.

The total thickness of the laminate is 6 mm.

EXAMPLE 2

Example 1 is repeated, the aqueous dispersion of a polyurethane used being such a dispersion based on polybutylene adipate with a molecular weight $\overline{M}w$ of 4,000 and a mixture of hexamethylene diisocyanate and isophorone diisocyanate. A resin mixture of polyacrylate and cellulose acetobutyrate was used as the colour for applying the coloured decoration, and the total thickness of the laminate is 3 mm.

EXAMPLE 3

Example 1 is repeated, a polycarbonate film, polished to a high gloss on one side and matt on one side, of the bisphenol A homopolycarbonate of Example 1 with a thickness of 200 μm being employed.

After printing-on the coloured decorative layer, a second polyurethane layer is applied from the polyurethane dispersion by the screen printing process.

Thermoplastic polystyrene with a $\overline{M}w$ of 40,000 is injected under the layer of four components.

The total thickness of the laminate is 8 mm.

We claim:

1. A laminate with a thickness of 0.5 mm to 20 mm, comprising layers (A) to (D) in the sequence (A) to (D) wherein:
   (A) is a 0.02 mm to 0.8 mm thick film of a thermoplatic;
   (B) is a polyurethane layer 2 to 80 μm thick which is tack-free at room temperature and which is the reaction product of (i) 2,4- and/or 2,6-diisocyantotoluene, 4,4'-diisocyanato-diphenylmethane, isophorone diisocyanate, 1,5-diisocyanato-naphthalene or mixtures thereof, with (ii) a polyester-diol in the molecular weight range ($\overline{M}w$ of 1,000 to 4,000 on adipic acid and a glycol which is ethylene glycol, 1,4-dihyroxybutane, 1,6-dihydroxyhexane, or mixtures thereof, and wherein (i) and (ii) have an NCO/OH equivalen ratio of (0.9:1) to (1:1.1);
   (C) is a color layer; and
   (D) is a thermoplatic layer with a thickness of 0.4 mm to 19 mm.

2. A laminate according to claim 1 wherein layer (A) is a thermoplatic cellulose ester, thermoplastic polyvinyl chloride, thermoplastic sytrene/acrylonitrile copolymer, thermoplastic polycarbonate, thermoplastic polyarylsulfone, or thermoplatic polymethylmethacrylate.

3. A laminate according to claim 1 wherein layer (A) is 0.05 to 0.8 mm thick.

4. A laminate according to claim 1 wherein (D) is a thermoplastic polymethyl methacrylate, thermoplastic acryloditrile/butadiene/styrene copolymer, thermoplastic polystyrene, thermoplastic polycarbonate, thermoplastic styrene/acrylonitrile copolymer or thermoplastic cellulose ester.

5. A laminate according to claim 1 which comprises an additional layer between layers (C) and (D) which is polyurethane layer 2 to 80 μm thick and comprises the reaction product of (i) 2,4- and/or 2,6-diisocyantotoluene, 4,4'-diisocyanato-dipenylmethane, isophorone diisocyanage, 1,5-diisocyanato-naphthalene or mixtures thereof, with (ii) a polyester-diol in the molecular weight range ($\overline{M}w$) of 1,000 to 4,000 on adipic acid and a glycol which is ethylene glycol, 1,4-dihydroxybutane, 1,6-dihydroxyhexane, or mixtures thereof, and wherein (i) and (ii) have an NCO/OH equivalen ration (0.9:1) to (1:1.1).

6. A process for the production of a laminate according to claim 1 wherein a 0.02 mm to 0.8 mm thick film of thermoplastic is coated with polyurethane, then coated with a color layer, then with a second polyurethane layer by the screen printing process and, finally, a thermoplastic layer is injected under the other layers, to give a layer thickness of 0.4 mm to 19 , wherein both of the two polyurethane layers are tack free at room temperature and comprise the reaction product of (i) 2,4- and/or 2,6-diisocyantotoluene, 4,4'-diisocyanato-diphenylmethane, isophorone diisocyanate, 1,5-diisocyanatonaphthalene or mixtures thereof, with (ii) a polyester-diol in the molecular weight range ($\overline{M}w$) of 1,000 to 4,000 on adipic acid and a glycol which is ethylene glycol, 1,4-dihydroxybutane, 1,6-dihydroxyhexane, or mixtures thereof, and wherein (i) and (ii) have anNCO/OH equivalent ratio of (0.9L1) to (1:1.1).

* * * * *